E. WRIGHT.
Walking Cane Umbrellas.

No. 138,726.  Patented May 6, 1873.

WITNESSES. Harry W. Douty
John L. Rupertus

Edmund Wright
by his Attys
Howson and Son

UNITED STATES PATENT OFFICE.

EDMUND WRIGHT, OF PHILADELPHIA, PENNSYLVANIA.

IMPROVEMENT IN WALKING-CANE UMBRELLAS.

Specification forming part of Letters Patent No. 138,726, dated May 6, 1873; application filed September 25, 1872.

*To all whom it may concern:*

Figure 1:
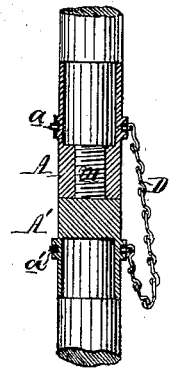

Be it known that I, EDMUND WRIGHT, of the city and county of Philadelphia, State of Pennsylvania, have invented a Screw-Coupling for Umbrellas and Parasols, of which the following is a specification:

My invention consists, first, of a walking-stick parasol, the handle of which is in sections capable of being connected together and detached; and, secondly, of devices whereby to connect, so as to permit them to be readily uncoupled, the sticks of parasols without danger of losing the disconnected portion of the stick, and this object I attain by combining the screw-coupling A A' of the stick B (see Figure 1) with a chain, D, one end of which is connected to a ring, $a$, on one-half of the coupling, and the other end to a ring, $a'$, on the other half of the coupling, one or both of the rings being so loose that the couplings may be unscrewed without twisting the chain, which always serves to prevent the loss of the detached portion of the stick.

Figure 2:
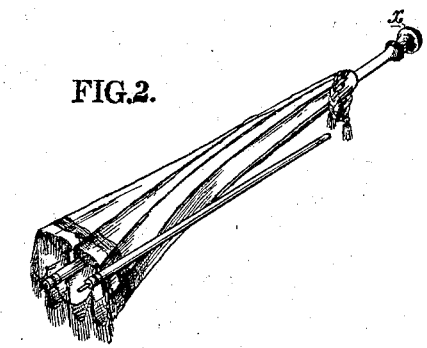

It is now the common fashion to use a parasol as a walking-stick, having its handle at $x$, as shown in Fig. 2; hence the stick of the parasol must necessarily be longer than in those of an older fashion, and this lengthening of the stick renders it difficult to pack the parasol into a small compass; hence I make the parasol-stick in two parts, connected together by a screw-coupling, which consists of two metal sockets, A and A', one fitted to one portion and the other to the other portion of the stick, and one socket having a screw-pin, $m$, adapted to a threaded orifice in the other socket.

The two coupling-sockets are connected together by a chain, D, one end of which is connected to a ring, $a$, on one socket, and the other end to a similar ring, $a'$, on the other socket, as before remarked, the rings being so adapted to grooves on the socket that while they can turn freely thereon, thereby permitting the unscrewing of the handle without twisting the chain, they cannot move longitudinally.

The chain may be permanently atached at one end to one socket, and at the other end to a ring adapted to a groove in the other socket, although I prefer the connecting of each end of the chain to a ring, in the manner described.

The screw-coupling forms a perfectly rigid joint, and prevents any yielding or play of one section of the stick upon the other when the parasol is used as a walking-cane.

I claim as my invention—

1. A walking-stick parasol, the handle or stick of which is in sections capable of being connected to or detached from each other, for the purpose set forth.

2. The combination, with the sections of a parasol or umbrella stick, of a coupling, consisting of two metal blocks, A A', each having a socket to receive the end of one of the sections, and one having a threaded projection adapted to a recess in the other, and a chain secured to a ring or rings, and permanently connecting the sections without preventing them from turning independently, as specified.

In testimony whereof I have signed my name to this specification in the presence of two subscribing witnesses.

EDMUND WRIGHT.

Witnesses:
 WM. A. STEEL,
 HARRY W. DOUTY.